(12) United States Patent
Nakagawa et al.

(10) Patent No.: US 7,316,629 B2
(45) Date of Patent: Jan. 8, 2008

(54) PLANETARY GEAR APPARATUS

(75) Inventors: Kaneyoshi Nakagawa, Anjo (JP);
Naoji Katou, Anjo (JP); Susumu Kato, Anjo (JP); Hiroshi Ota, Anjo (JP)

(73) Assignee: Aisin Aw Co., Ltd., Anjo (JP)

( * ) Notice: Subject to any disclaimer, the term of this patent is extended or adjusted under 35 U.S.C. 154(b) by 71 days.

(21) Appl. No.: 11/257,034

(22) Filed: Oct. 25, 2005

(65) Prior Publication Data

US 2006/0089228 A1   Apr. 27, 2006

(30) Foreign Application Priority Data

Oct. 26, 2004   (JP) .............................. 2004-310552

(51) Int. Cl.
*F16H 57/08* (2006.01)
(52) U.S. Cl. ....................................... 475/331
(58) Field of Classification Search ............... 475/319, 475/323, 325
See application file for complete search history.

(56) References Cited

U.S. PATENT DOCUMENTS

| | | | |
|---|---|---|---|
| 3,527,121 A * | 9/1970 | Moore ......................... | 475/338 |
| 5,509,865 A | 4/1996 | Hall, III | |
| 6,056,665 A * | 5/2000 | Raghavan et al. ........... | 475/280 |
| 6,422,971 B1 | 7/2002 | Katou et al. | |
| 6,434,827 B1 * | 8/2002 | Trent et al. ................. | 29/893.1 |
| 6,743,148 B2 | 6/2004 | Hayabuchi et al. | |
| 2005/0192151 A1 * | 9/2005 | Simon ......................... | 475/331 |
| 2005/0192152 A1 * | 9/2005 | Kimes ......................... | 475/331 |

FOREIGN PATENT DOCUMENTS

| | | |
|---|---|---|
| DE | 4230462 A1 * | 3/1993 |
| JP | A-10-169728 | 6/1998 |
| JP | 2852819 B | 11/1998 |
| JP | A-2001-108027 | 4/2001 |
| JP | A-2001-304355 | 10/2001 |
| JP | A-2002-130391 | 5/2002 |
| JP | A-2002-130392 | 5/2002 |

* cited by examiner

*Primary Examiner*—Sherry Estremsky
*Assistant Examiner*—Edwin A Young
(74) *Attorney, Agent, or Firm*—Oliff & Berridge, PLC (57) ABSTRACT

A double pinion planetary gear unit includes a first sun gear, a second sun gear, a plurality of short pinions, a plurality of long pinions, a ring gear and a carrier. The carrier includes a first flange portion that supports an end side of the short pinions and an end side of the long pinions, a cylindrical portion that is connected to the first flange portion and that forms a cover for an outer peripheral side where the short pinions and the long pinions mesh with each other, a second flange portion that supports another end side of the long pinions, and a plurality of bridge portions that extend from the second flange portion toward the short pinions and that support another end side of the short pinions.

20 Claims, 6 Drawing Sheets

PLANETARY GEAR APPARATUS

CROSS-REFERENCE TO RELATED APPLICATION

The disclosure of Japanese Patent Application No. 2004-310552 filed on Oct. 26, 2004 including the specification, drawings and abstract is incorporated herein by reference in its entirety.

BACKGROUND

The present invention relates to a planetary gear unit for use in an automatic transmission.

Generally, planetary gear units of a double pinion type (called Ravigneaux type) are used in automotive automatic transmissions. Such a planetary gear unit, as described in Japanese Patent Application Laid-Open Publication No. HEI 10-169728 (paragraph 0023, FIG. 4), includes first and second sun gears that are each rotatably supported on an input shaft, a plurality of short pinions that mesh with the first sun gear and are disposed on a circumference thereof, a plurality of long pinions that mesh with the short pinions and the second sun gear and that are disposed on a circumference thereof, a ring gear that meshes with the long pinions, and a carrier that rotatably supports each of the short pinions and the long pinions.

Figure 7:
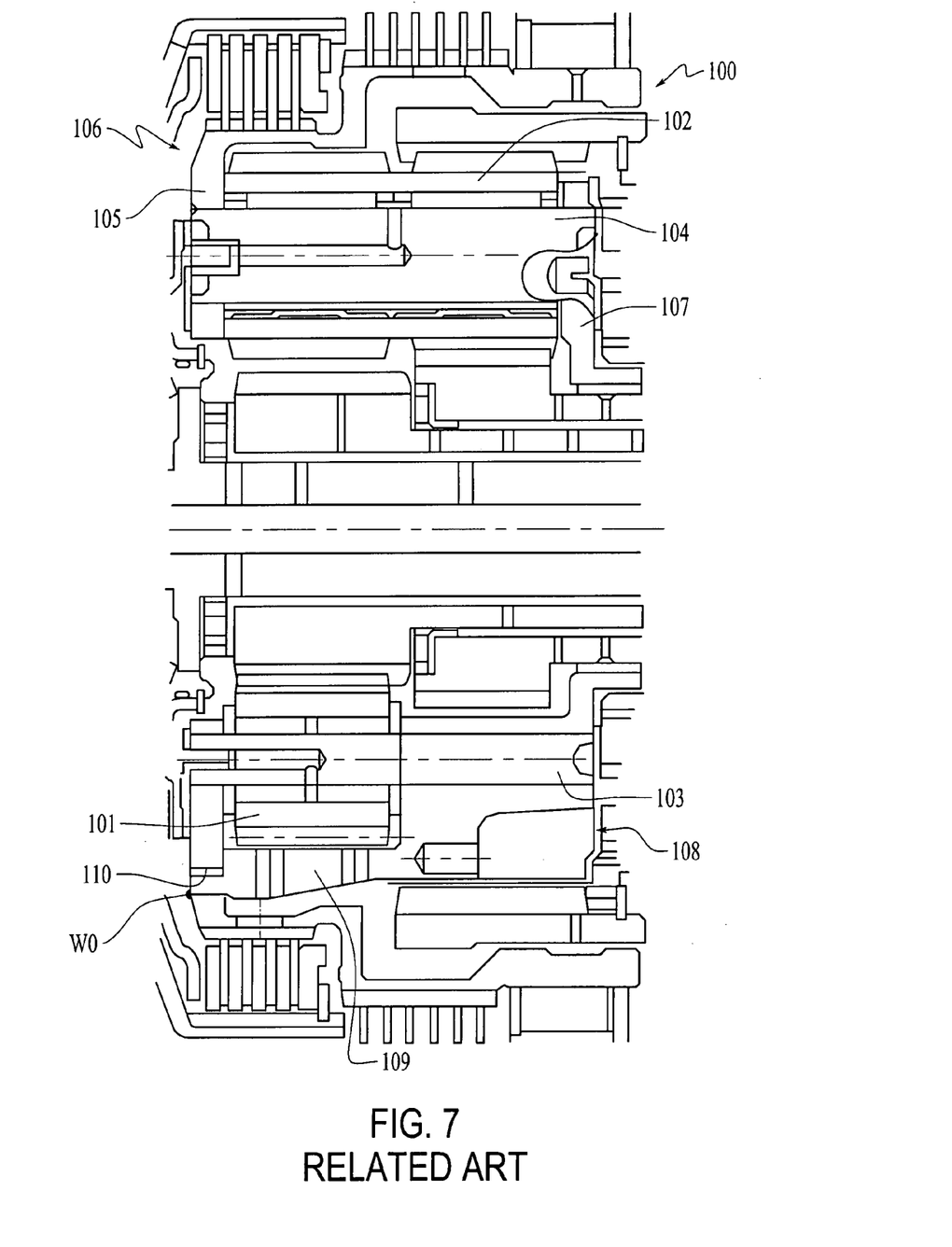
FIG. 7 is a sectional view illustrating a carrier in a related-art double pinion-type planetary gear unit.

As shown in FIG. 7, a related-art carrier 100 used in a double pinion-type planetary gear unit includes two members: a cylinder-shaped first carrier body 106 provided with a flange portion 105 that supports an end of each of support shafts 103, 104 that rotatably support the short pinions 101 and the long pinions 102, respectively; and a second carrier body 108 provided with a flange portion 107 that is spaced from the flange portion 105 of the first carrier body 106 by a predetermined distance in an axial direction, and that supports another end of each of the support shafts 103, 104. The flange portion 107 of the second carrier body 108 is engaged with a bridge connecting portion 110 formed in the flange portion 105 of the first carrier body 106, by a plurality of circumferential bridge portions 109 that extend in the axial direction, and is joined together therewith by a weld W0.

SUMMARY

In the double pinion-type planetary gear unit shown in FIG. 7, the sizes of the pinions are determined based on constraints created by the needle capacity and gear ratio. The bridge portion 109 of the second carrier body 108 thus becomes elongated in the axial direction. Furthermore, due to the presence of the long pinions 102, it is impossible to adopt a box-structure bridge portion 109. Still further, since the space in the radial direction is also limited, there is a constraint in that the radial-direction wall thickness cannot be increased. In addition, in a planetary gear unit provided with four sets of a short pinion 101 and a long pinion 102, for example, on a circumstance, the space in the circumferential direction to insert the bridge portion 109 is also constrained. It also becomes more difficult to secure a sufficient strength of the bridge portion 109, and there may be a possibility of a reduction in the twisting rigidity of the carrier 100.

In this type of planetary gear unit, in particular, the gears are often of bevel toothing. Therefore, the carrier 100 supporting the short pinions 101 and the long pinions 102 receives a twisting moment caused by the reaction force occurring in the meshing therebetween. Hence, if the rigidity of the carrier 100 is not sufficient, the carrier 100 deforms and the gear meshing becomes improper, possibly giving rise to problems in reduction of the durability of gears, occurrence of gear noises, etc.

The present invention thus provides a planetary gear unit in which the carrier has an increased rigidity.

A planetary gear unit according to a first exemplary aspect of the present invention includes a first sun gear, a second sun gear, a plurality of short pinions that mesh with the first sun gear, a plurality of long pinions that mesh with the second sun gear and with the short pinions, a ring gear that meshes with the long pinions and a carrier that rotatably supports the short pinions and the long pinions. The carrier includes a first flange portion that supports an end side of the short pinions and an end side of the long pinions, a cylindrical portion that is connected to the first flange portion and that forms a cover for an outer peripheral side where the short pinions and the long pinions mesh with each other, a second flange portion that supports another end side of the long pinions, and a plurality of bridge portions that extend from the second flange portion toward the short pinions and that support another end side of the short pinions.

A planetary gear unit according to a second exemplary aspect of the present invention includes a first sun gear, a second sun gear, a plurality of short pinions that mesh with the first sun gear, a plurality of long pinions that mesh with the second sun gear and with the short pinions, a ring gear that meshes with the long pinions and a carrier that rotatably supports the short pinions and the long pinions. The carrier includes a first flange portion that supports an end side of the short pinions and an end side of the long pinions, a second flange portion that supports another end side of the long pinions, and a plurality of bridge portions that extend from the second flange portion toward the short pinions and that support another end side of the short pinions, wherein the first flange portion and the plurality of bridge portions are joined via an annular protruded portion.

BRIEF DESCRIPTION OF THE DRAWINGS

Various embodiments of the invention will be described with reference to the drawings, wherein.

DETAILED DESCRIPTION OF EMBODIMENTS

Figure 1:
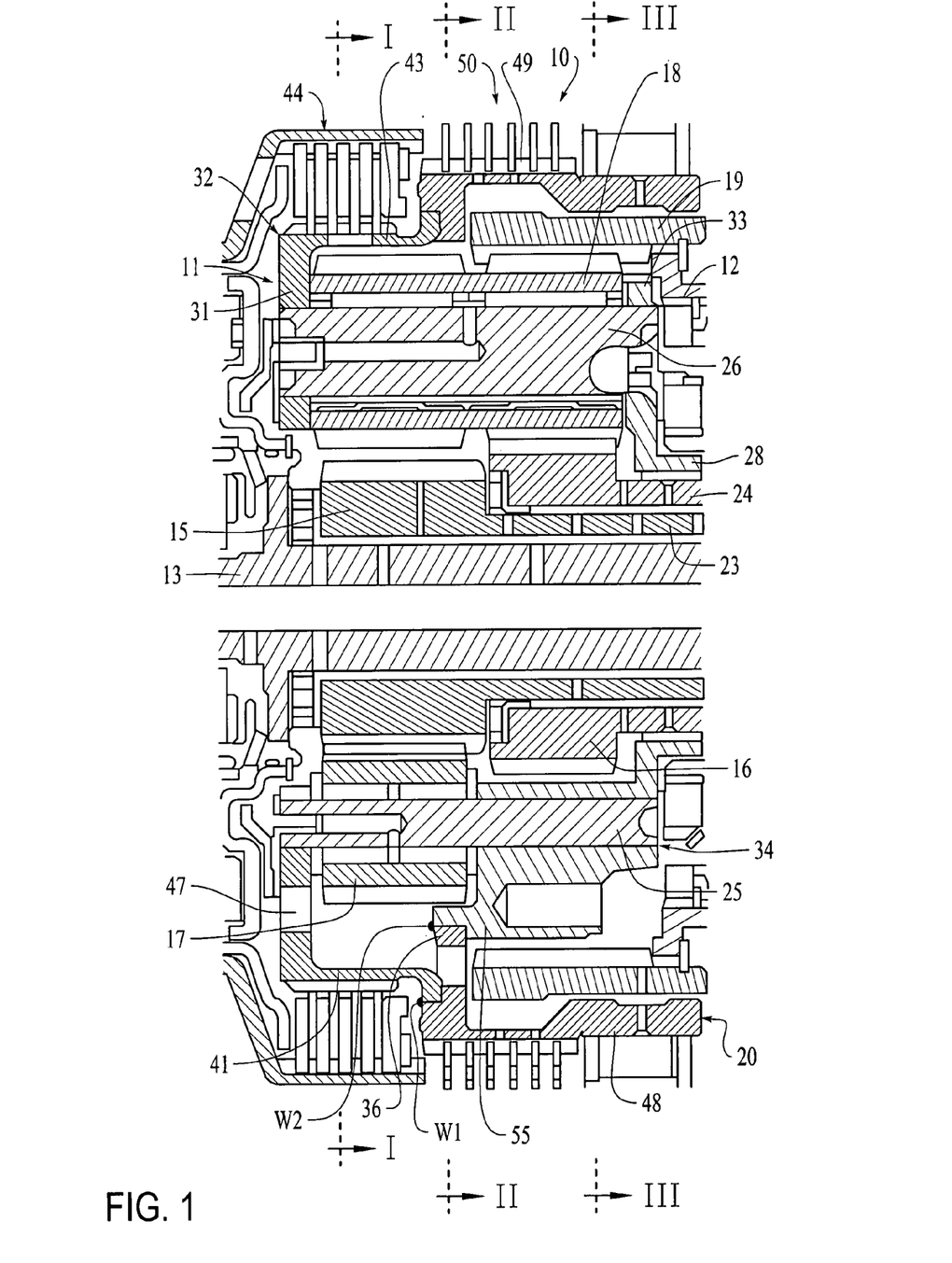
FIG. 1 is a sectional view of a double pinion-type planetary gear unit, illustrating an embodiment of the present invention.
Figure 2:
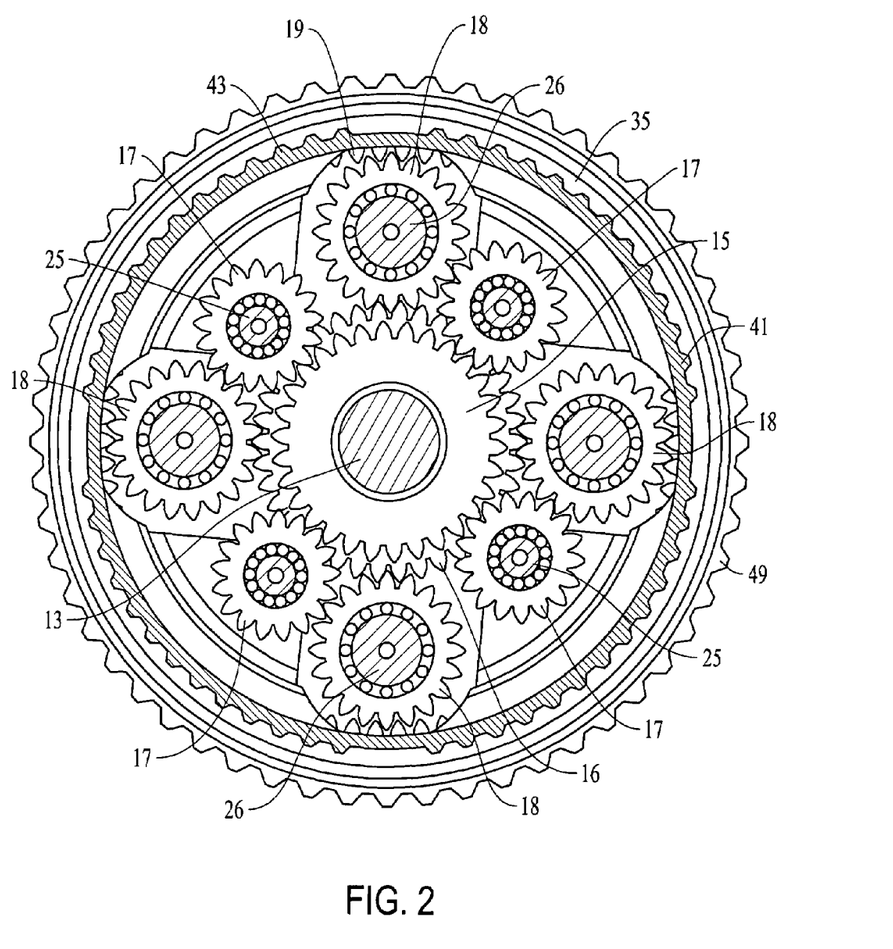
FIG. 2 is a sectional view taken on line I-I in FIG. 1.
Figure 3:
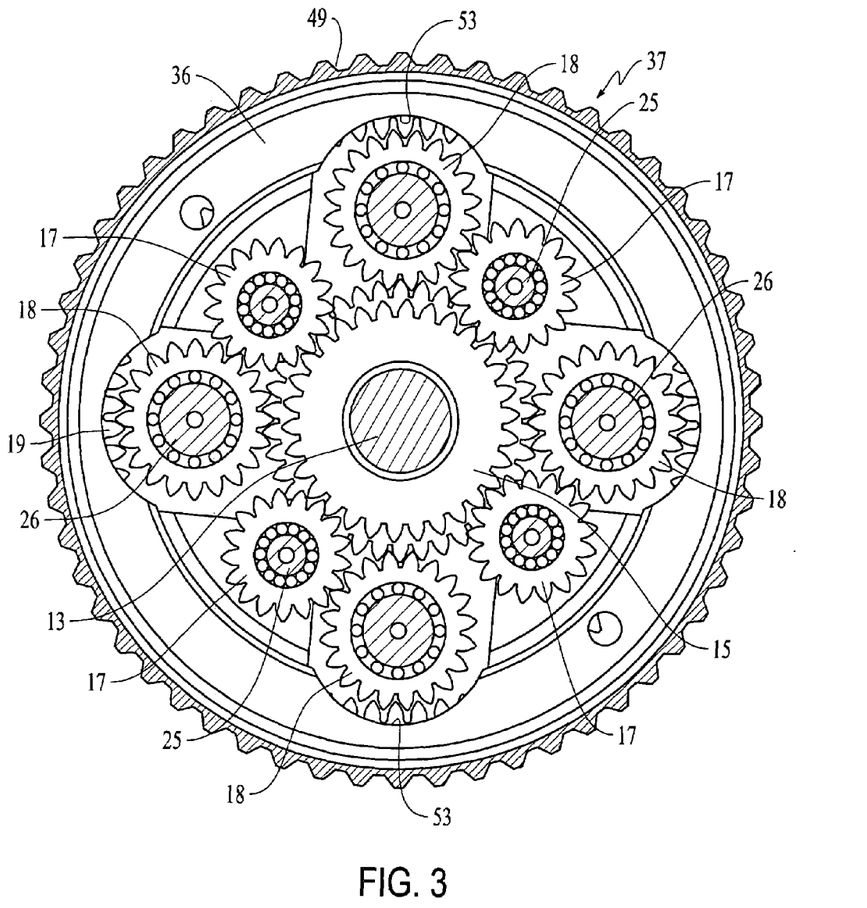
FIG. 3 is a sectional view taken on line II-II in FIG. 1.
Figure 4:
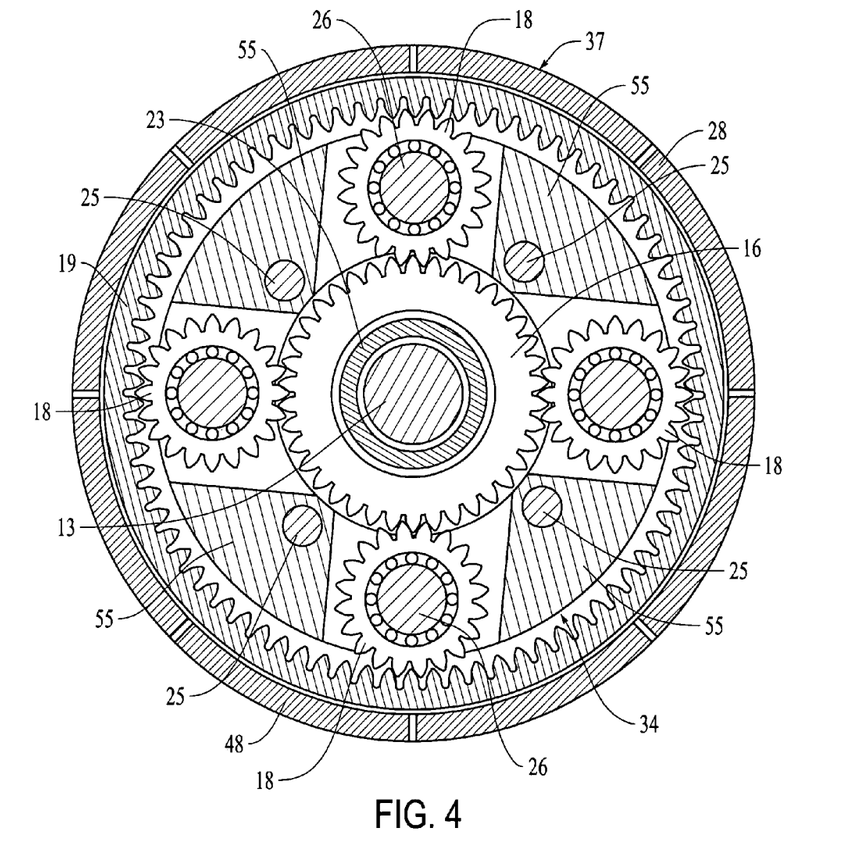
FIG. 4 is a sectional view taken on line III-III in FIG. 1.

Hereinafter, a first embodiment of the present invention will be described with reference to drawings. FIG. 1 shows a double pinion-type planetary gear unit 10 combining two sets of planetary gears, that is, first and second planetary gears 11, 12. FIG. 2, FIG. 3 and FIG. 4 show sectional views taken on line I-I, line II-II and line III-III in FIG. 1, respectively. The planetary gear unit 10 is structured mainly of an input shaft 13 supported by a case (not shown) so as to be rotatable, first and second sun gears 15, 16 supported on the input shaft 13 so that each of the sun gears 15, 16 is rotatable, a plurality of circumferentially disposed short pinions 17 that mesh with the first sun gear 15, a plurality of circumferentially disposed long pinions 18 that mesh with the short pinions 17 and the second sun gear 16, a ring gear 19 that meshes with the long pinions 18, and a carrier 20 that supports the short pinions 17 and the long pinions 18 so that each of the pinions 17, 18 is rotatable.

The input shaft 13 is rotationally driven by an engine (not shown). A first hollow shaft 23 formed integrally with the first sun gear 15 is rotatably supported on the input shaft 13. A second hollow shaft 24 formed integrally with the second sun gear 16 is rotatably supported on the first hollow shaft 23. The first sun gear 15 and the second sun gear 16 are disposed side by side in the direction of an axis, and the second sun gear 16 is slightly larger in diameter than the first sun gear 15.

The carrier 20 supports both ends of each of four short pinion shafts 25 equiangularly on a circumference. These short pinion shafts 25 rotatably support the short pinions 17, respectively. The short pinions 17 are meshed with the first sun gear 15. Furthermore, the carrier 20 also supports both ends of each of four long pinion shafts 26 equiangularly on a circumference. These long pinion shafts 26 rotatably support the long pinions 18, respectively. In FIG. 1, it is shown that a right-side half portion of one of the long pinions 18 is meshed with the second sun gear 16 and the ring gear 19, and a left-side half portion thereof is meshed with a corresponding one of the short pinions 17.

Next, a concrete structure of the carrier 20 will be described with reference to the exploded view shown in FIG. 5 and the perspective views for an assembling sequence shown in FIGS. 6A to 6C. In this embodiment, the carrier 20 is illustrated with an example arrangement that is made up of three component members (pieces) so that it can be formed mainly by press working. That is, the carrier 20 is divided into a first carrier body 32 having a disc-shaped first flange portion 31 that supports one side of the short pinion shafts 25 and the long pinion shafts 26, and a second carrier body 34 having a disc-shaped second flange portion 33 that supports the other side of the long pinion shafts 26. A cylindrical support portion 28 formed in the second carrier body 34 is rotatably supported on the second hollow shaft 24 formed integrally with the second sun gear 16.

Furthermore, the first carrier body 32 is made up of two members: a carrier member 35 in which the first flange portion 31 is formed; and a hub member 37 in which an annular protruded portion 36 (described later) is formed. The carrier 20, made up of three pieces in this manner, has a box structure in which the carrier member 35 and the hub member 37 of the first carrier body 32 are welded to each other by a weld W1 as described below, and the annular protruded portion 36 of the hub member 37 and the second carrier body 34 are welded to each other by a weld W2 as described below.

The carrier member 35 constituting the first carrier body 32 has a cylinder shape in which an outer peripheral portion of the disc-shaped first flange portion 31 is bent in the direction of an axis, so that a cylindrical portion 41 of the carrier member 35 extends substantially to a middle position on the long pinions 18 in the direction of the axis, forming an all-around cover for an outer peripheral side of a double pinion portion where the short pinions 17 and the long pinions 18 mesh with each other. A junction portion 42 slightly bent radially outward is formed in a distal end of the cylindrical portion 41. Furthermore, a first spline portion 43 is formed in an outer periphery of the cylindrical portion 41, and a multi-disc clutch mechanism 44 is coupled to the first spline portion 43. Thus, the cylindrical portion 41 of the carrier member 35 forms a clutch hub of the multi-disc clutch mechanism 44. Incidentally, in FIGS. 6A to 6C, the first spline portion 43 is omitted for simplified illustrations.

Figure 6A:
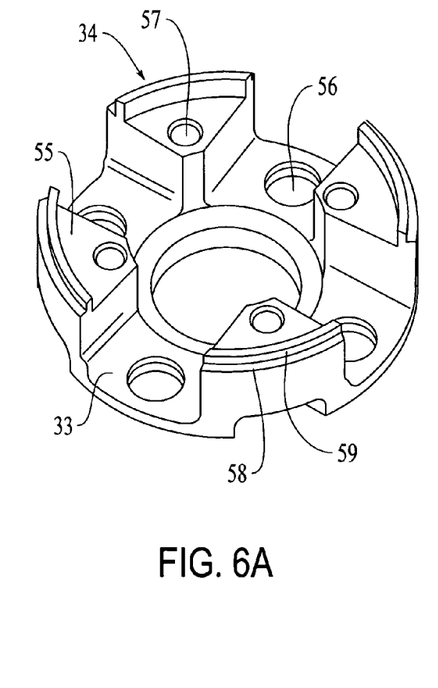
FIGS. 6A to 6C are perspective views illustrating the assembling sequence of the carrier shown in FIG. 5.
Figure 6B:
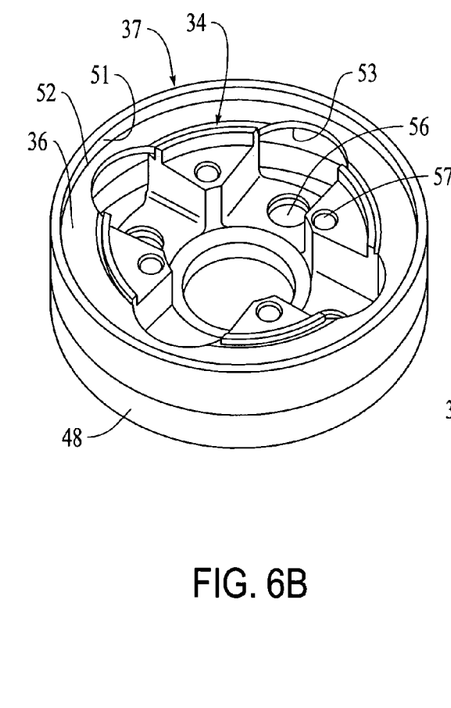
Figure 6C:
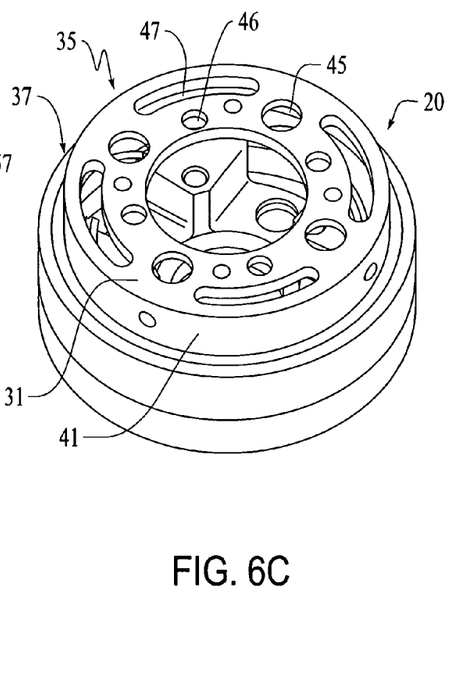

As clearly illustrated in FIG. 6C, four circumferentially and equiangularly arranged shaft holes 45 that support shaft ends of the long pinion shafts 26 are formed in the first flange portion 31 of the carrier member 35. Formed between the four shaft holes 45 are four circumferentially and equiangularly arranged shaft holes 46 that support shaft ends of the short pinion shafts 25. At an outer peripheral side of the four shaft holes 46, arc-shaped windows 47 are formed at a plurality of positions on a circumference (four positions in this embodiment). These windows 47 are open to a space portion between the short pinions 17 and the cylindrical portion 41 of the carrier member 35.

The hub member 37 forming a part of the first carrier body 32 has a cylindrical hub portion 48 that surrounds the ring gear 19. The cylindrical hub portion 48 extends in the direction of the axis, at the outer peripheral side of the annular protruded portion 36. A second spline portion 49 that is larger in diameter than the first spline portion 43 is formed on an outer periphery of the cylindrical hub portion 48. A multi-disc brake mechanism 50 is coupled to the second spline portion 49. Thus, the cylindrical hub portion 48 of the hub member 37 forms a brake hub of the multi-disc brake mechanism 50. Incidentally, in FIGS. 6A to 6C, the second spline portion 49 as well as the first spline portion 43 is omitted.

The annular protruded portion 36 protruding radially inward is formed on an end of the cylindrical hub portion 48 which is on the side of connection to the carrier member 35. The protruded portion 36 is positioned substantially at a center of the long pinions 18, and extends to a position at a side of the ring gear 19. The radially inward edge of the annular protruded portion 36 extends to a radially inward side of the radially inward edge of the ring gear 19 that meshes with the long pinions 18. In the radially inward edge of the annular protruded portion 36, arc-shaped cutouts 53 are formed at four angular positions on a circumference that correspond to the long pinions 18, as also shown in FIG. 6B. This minimizes the increases in the diameter of the first carrier body 32 and, therefore, the diameter of the carrier 20.

Figure 5:
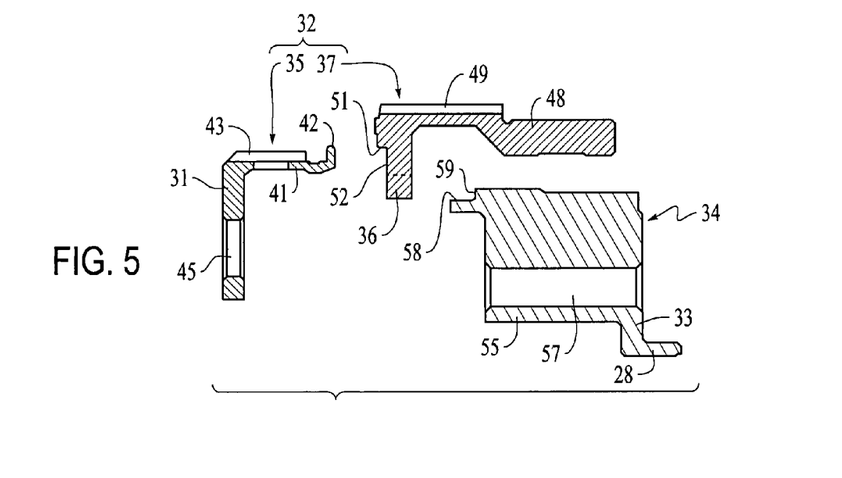
FIG. 5 is an exploded view of a carrier in an embodiment of the present invention.

Formed at a side of the annular protruded portion 36 is a junction portion that is formed by an inner peripheral surface 51 with its center being on the center axis of the input shaft 13, and an end surface 52 that connects to the inner peripheral surface 51 at the right angle, as also shown in FIG. 5. An outer peripheral surface of the junction portion 42 of the carrier member 35 is fitted to the inner peripheral surface 51, with a side surface of the junction portion 42 contacting the end surface 52. In this state, the two parts are joined together by the weld W1. The weld W1 is performed from the left in FIG. 1 and FIG. 5.

As best shown in FIG. 6A, the second carrier body 34 is provided with a plurality of (four in the embodiment) circumferentially disposed bridge portions 55 that are projected from the end surface of the disc-shaped second flange portion 33 toward the side of the short pinions 17. In the second flange portion 33 of the second carrier body 34, four shaft holes 56 that support shaft ends of the long pinion shafts 26 are formed equiangularly on a circumference. In the bridge portions 55 located between the four shaft holes 56, four shaft holes 57 that support shaft ends of the short pinion shafts 25 are formed equiangularly on a circumference. Formed in a distal end portion of each bridge portion 55 is a junction portion that is structured of an arc surface 58 with its center being on the center axis of the input shaft 13, and an end surface 59 that connects to the arc surface 58 at the right angle, as also shown in FIG. 5. The inner periphery of the annular protruded portion 36 is fitted to the arc surfaces 58, with the protruded portion 36 contacting the end surfaces 59. In this state, the two parts are joined integrally by the weld W2. Thus, the cylindrical portion 41 of the first carrier body 32 and the bridge portions 55 of the second carrier body 34 are joined with each other, via the annular protruded portion 36. The weld W2 is formed at four locations on a circumference from leftward in FIG. 1 and FIG. 5, via the arc-shaped windows 47 that are open in the first flange portion 31 of the carrier member 35 corresponding to the bridge portions 55. Incidentally, in order to facilitate the understanding regarding FIG. 5, the shaft holes 45, 57 that fit to and support the long pinion shafts 26 and the short pinion shafts 25, respectively, are illustrated as if they were in the same phase.

Thus, the welds W1, W2 at two locations, that is, the weld between the annular protruded portion 36 and the carrier member 35 of the first carrier body 32, and the weld between the bridge portions 55 of the second carrier body 34 and the annular protruded portion 36, can be formed from the same direction (e.g., on one side of the carrier). Therefore, the carrier 20 made up of three pieces can be assembled in a single welding process, and the number of assembling processes can be reduced.

The planetary gear unit 10 having the above-described structure is assembled as follows. Firstly, the three members, that is, the carrier member 35 and the hub member 37 of the first carrier body 32, and the second carrier body 34, are integrally joined to form the carrier 20 having a box structure.

That is, the inner periphery of the annular protruded portion 36 of the hub member 37 of the first carrier body 32 is socket-and-spigot fitted to the arc surfaces 58 formed on the distal end portions of the bridge portions 55 of the second carrier body 34, and the side surface of the annular protruded portion 36 is brought into contact with the end surface 59. Furthermore, the outer periphery of the junction portion 42 of the carrier member 35 of the first carrier body 32 is socket-and-spigot fitted to the inner peripheral surface 51 of the annular protruded portion 36 of the hub member 37, and the side surface of the junction portion 42 is brought into contact with the end surface 52. In this state, the carrier member 35 and the annular protruded portion 36 of the hub member 37 are integrally joined by the weld W1 to form the first carrier body 32, and the second carrier body 34 is integrally joined to the annular protruded portion 36 by the weld W2. This weld W2 is formed via the arc-shaped windows 47 that are open in the first flange portion 31 of the carrier member 35.

In this manner, the carrier 20 with a box structure is completed. The bridge portions 55 of the carrier 20 are joined, via the annular protruded portion 36, to the cylindrical portion 41 that forms an all-around cover for the outer peripheral side of the double pinion portion where the short pinions 17 and the long pinions 18 mesh with each other. Therefore, the length of the bridge portions 55 in the direction of the axis can be shortened. Furthermore, it is no longer necessary that the bridge portions 55 extend through a limited space around the short pinions 17 as in the related-art technologies, and the constraint of the wall thickness in a radial direction becoming less is no longer present. Hence, a sufficient sectional area can be secured, and the twisting rigidity can be considerably increased.

Furthermore, the two welds W1, W2 can both be formed from the same direction, so that the assembly of the carrier 20 can be performed in one welding process.

Next, the four circumferentially disposed long pinion shafts 26 rotatably supporting the long pinions 18, respectively, are fitted to and supported by shaft holes 45, 56 of first and second flange portions 31, 33 of the carrier 20. Likewise, the four circumferentially disposed short pinion shafts 25 rotatably supporting the short pinions 17, respectively, are fitted to and supported by the shaft holes 46, 57 of the first and second flange portions 31, 33, while the short pinions 17 and the long pinions 18 are in mesh. Furthermore, the second sun gear 16 is fitted to and supported by the cylindrical support portion 28 of the second carrier body 34 while the second sun gear 16 meshes with the long pinions 18. The first sun gear 15 is fitted to and supported by the second sun gear 16 while the first sun gear 15 meshes with the short pinions 17. Still further, the ring gear 19 is meshed with the long pinions 18.

Thus, the planetary gear unit 10 is provided as an assembly. Then, the planetary gear unit 10 is assembled into an automatic transmission, with the first hollow shaft 23 of the first sun gear 15 being fitted to and supported by the input shaft 13, and the clutch plates of the brake mechanism 50 and the clutch mechanism 44 being engaged with the first and second spline portions 49, 43 of the carrier 20.

Incidentally, although in conjunction with the foregoing embodiment, a case where the planetary gear unit 10 is applied to an automatic transmission has been described, the present invention is not limited to that case. The present invention is applicable to any apparatus or mechanism provided with a double pinion-type planetary gear unit 10 that combines two sets of planetary gears 11, 12.

Furthermore, although in conjunction with the foregoing embodiment, the double pinion-type planetary gear unit 10 in which four circumferentially disposed short pinions 17 and four circumferentially disposed long pinions 18 are provided has been described, the numbers of the short and long pinions are not limited in the present invention. For example, the invention is also applicable to a planetary gear unit in which three circumferentially disposed short pinions and three circumferentially disposed long pinions are provided. The numbers thereof can be suitably selected in accordance with the required capacity of the planetary gear unit.

In conjunction with the foregoing embodiment, an example in which the carrier 20 is structured of three component members (3 pieces) has been described. This 3-piece structure is effective in that the component members can be formed mainly by press working and therefore production costs can be reduced, or in that a material optimal in accordance with the function of each portion can be selected. However, if these points are put aside, the annular protruded portion 36 formed in the hub member 37 forming a part of the first carrier body 32 may instead be formed on the side of the carrier member 35, so that the carrier 20 can be structured of two members, that is, the first carrier body 32 and the second carrier body 34. On the other hand, a structure in which the carrier 20 is formed of 4 or more component members (pieces) for the purpose of increasing the workability and the variation of materials, or the like, is not excluded either.

Furthermore, although in conjunction with the foregoing embodiment, an example in which the first and second sun gears 15, 16 are supported on the input shaft 13 has been described above, the present invention is not limited to such a structure.

Furthermore, although in conjunction with the foregoing embodiment, in an example that takes advantage of the box structure of the carrier 20, splines for arranging friction plates that constitute a clutch or a brake are formed on an outer peripheral side of the cylindrical portion 41 of the carrier 20 and an outer peripheral side of the cylindrical hub portion 48 thereof has been described, the present invention is, as a matter of course, not limited to such a structure.

According to an exemplary aspect of the invention, the length of each bridge portion in the direction of an axis can be shortened. Furthermore, it is no longer necessary that the bridge portions extend through a limited space around the short pinions as in the related-art technologies. Hence, there are advantages in that a sufficient sectional area can be secured, and the twisting rigidity of the bridge portions and therefore the twisting rigidity of the carrier can be considerably increased.

According to another exemplary aspect of the invention, component members of the carrier can be formed mainly by press working, and the processing cost can be reduced, in addition to the aforementioned advantages of the first aspect.

According to another exemplary aspect of the invention, the increase in the diameter of the carrier can be minimized, thus contributing to a size reduction of the entire unit.

According to another exemplary aspect of the invention, the welding inside the carrier can easily be performed.

According to another exemplary aspect of the invention, the carrier can be assembled by a single welding process.

According to another exemplary aspect of the invention, a hub portion can be integrated with a carrier member. Hence, there are advantages in that the structure of a brake mechanism or a clutch mechanism in an automatic transmission can be simplified, and a size reduction becomes possible.

According to another exemplary aspect of the invention, it becomes possible to form the structure of a brake mechanism or a clutch mechanism in an automatic transmission. Hence, it is possible to make the carrier connectable to a predetermined rotating element of the automatic transmission or stoppable with respect to the case.

What is claimed is:

1. A double pinion planetary gear unit comprising:
    a first sun gear;
    a second sun gear;
    a plurality of short pinions that mesh with the first sun gear;
    a plurality of long pinions that mesh with the second sun gear and with the short pinions;
    a ring gear that meshes with the long pinions; and
    a carrier that rotatably supports the short pinions and the long pinions, the carrier comprising:
        a first flange portion that supports an end side of the short pinions and an end side of the long pinions,
        a cylindrical portion that is connected to the first flange portion and that forms a cover for an outer peripheral side where the short pinions and the long pinions mesh with each other,
        a second flange portion that supports another end side of the long pinions, and
        a plurality of bridge portions that extend from the second flange portion toward the short pinions and that support another end side of the short pinions, wherein:
            the cylindrical portion and the plurality of bridge portions are joined via an annular protruded portion, and
            a window is formed in the first flange portion adjacent the plurality of bridge portions.

2. The planetary gear unit according to claim 1, comprising a first carrier body structured of the first flange portion and the cylindrical portion, and a second carrier body structured of the second flange portion and the plurality of bridge portions.

3. The planetary gear unit according to claim 1, wherein the annular protruded portion extends to a radially inward side of a radially inward edge of the ring gear, and has arc-shaped cutouts at a plurality of angular positions on a circumference that corresponds to the long pinions.

4. The planetary gear unit according to claim 1, wherein the cylindrical portion and the annular protruded portion are joined by welding, and the annular protruded portion and the plurality of bridge portions are joined by welding, and the welding between the annular protruded portion and the plurality of bridge portions is performed via the window that is formed in the first flange portion adjacent the plurality of bridge portions.

5. The planetary gear unit according to claim 4, wherein the welding between the cylindrical portion and the annular protruded portion, and the welding between the annular protruded portion and the plurality of bridge portions are on one side of the carrier.

6. The planetary gear unit according to claim 2, wherein an outer peripheral surface of the cylindrical portion is provided with a spline portion structured to dispose of a friction plate.

7. The planetary gear unit according to claim 6, wherein the annular protruded portion has, at an outer peripheral side thereof, a hub portion that extends in an axial direction, and an outer peripheral surface of the hub portion is provided with a spline portion structured to dispose of a friction plate.

8. The planetary gear unit according to claim 1, wherein the annular protruded portion has, at an outer peripheral side thereof, a hub portion that extends in an axial direction, and an outer peripheral surface of the hub portion is provided with a spline portion structured to dispose of a friction plate.

9. The planetary gear unit according to claim 1, wherein an outer peripheral surface of the cylindrical portion is provided with a spline portion structured to dispose of a friction plate.

10. The planetary gear unit according to claim 1 wherein the window is formed between the short pinions and the cylindrical portion.

11. The planetary gear unit according to claim 1, wherein the annular protruded portion has, at an outer peripheral side thereof, a hub portion that extends in an axial direction and surrounds the ring gear.

12. The planetary gear unit according to claim 1, wherein the annular protruded portion is substantially at a center of the long pinions and extends at a side of the ring gear.

13. The planetary gear unit according to claim 1, wherein a junction portion is formed at a distal end of the cylindrical portion and the junction portion contacts an end surface of the annular protruded portion.

14. The planetary gear unit according to claim 1, wherein the bridge portions include an arc surface and an end surface and an inner periphery of the annular protruded portion is fitted to the arc surface with the annular protruded portion contacting the end surface.

15. The planetary gear unit according to claim 1, wherein the cylindrical portion extends substantially to a middle portion of the long pinions in an axial direction.

16. A double pinion planetary gear unit comprising:
    a first sun gear;

a second sun gear;

a plurality of short pinions that mesh with the first sun gear;

a plurality of long pinions that mesh with the second sun gear and with the short pinions;

a ring gear that meshes with the long pinions; and a carrier that rotatably supports the short pinions and the long pinions, the carrier comprising:

a first flange portion that supports an end side of the short pinions and an end side of the long pinions, a second flange portion that supports another end side of the long pinions, and a plurality of bridge portions that extend from the second flange portion toward the short pinions and that support another end side of the short pinions, wherein:

the first flange portion and the plurality of bridge portions are joined via an annular protruded portion, and a window is formed in the first flange portion adjacent the plurality of bridge portions.

17. The planetary gear unit according to claim 16, wherein the annular protruded portion extends to a radially inward side of a radially inward edge of the ring gear, and has arc-shaped cutouts at a plurality of angular positions on a circumference that corresponds to the long pinions.

18. The planetary gear unit according to claim 16, wherein the bridge portions include an arc surface and an end surface and an inner periphery of the annular protruded portion is fitted to the arc surface with the annular protruded portion contacting the end surface.

19. The planetary gear unit according to claim 16, wherein the first flange portion and the annular protruded portion are joined by welding, and the annular protruded portion and the plurality of bridge portions are joined by welding, and the welding between the annular protruded portion and the plurality of bridge portions is performed via the window that is formed in the first flange portion adjacent the plurality of bridge portions.

20. The planetary gear unit according to claim 19, wherein the welding between the first flange portion and the annular protruded portion, and the welding between the annular protruded portion and the plurality of bridge portions are on one side of the carrier.

* * * * *